Oct. 21, 1924.
E. ROUČKA
AUTOMATIC REGULATOR
Filed March 26, 1921  3 Sheets-Sheet 1
1,512,804
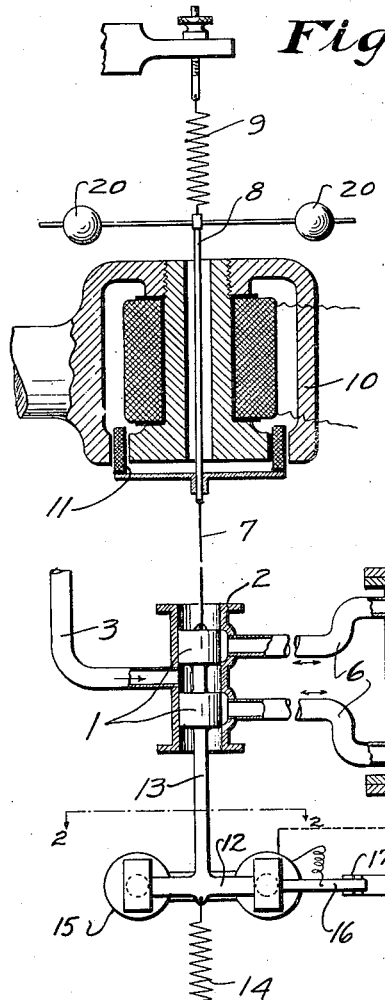
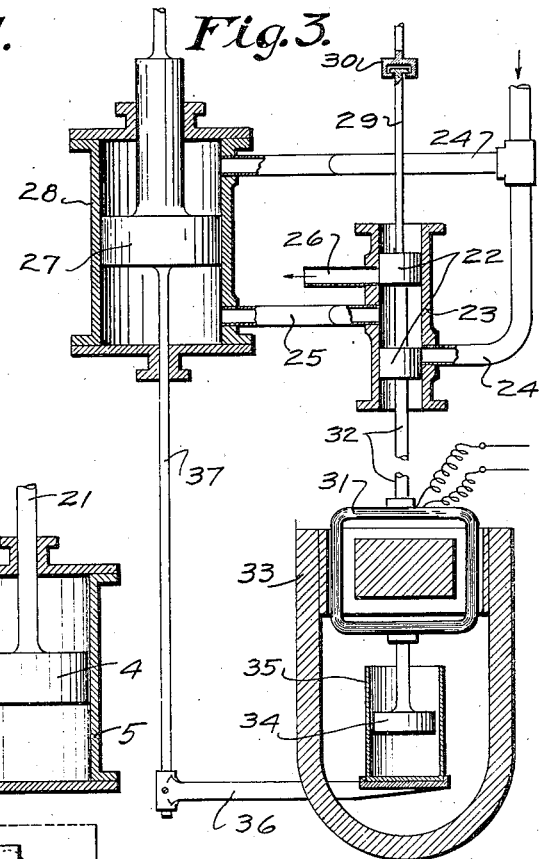
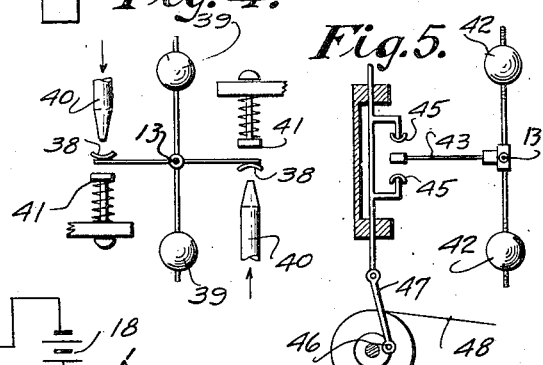
INVENTOR
Erich Roučka,
BY
Everett H Rook,
ATTORNEYS Oct. 21, 1924.  
E. ROUČKA  
AUTOMATIC REGULATOR  
Filed March 26, 1921    3 Sheets-Sheet 2
1,512,804
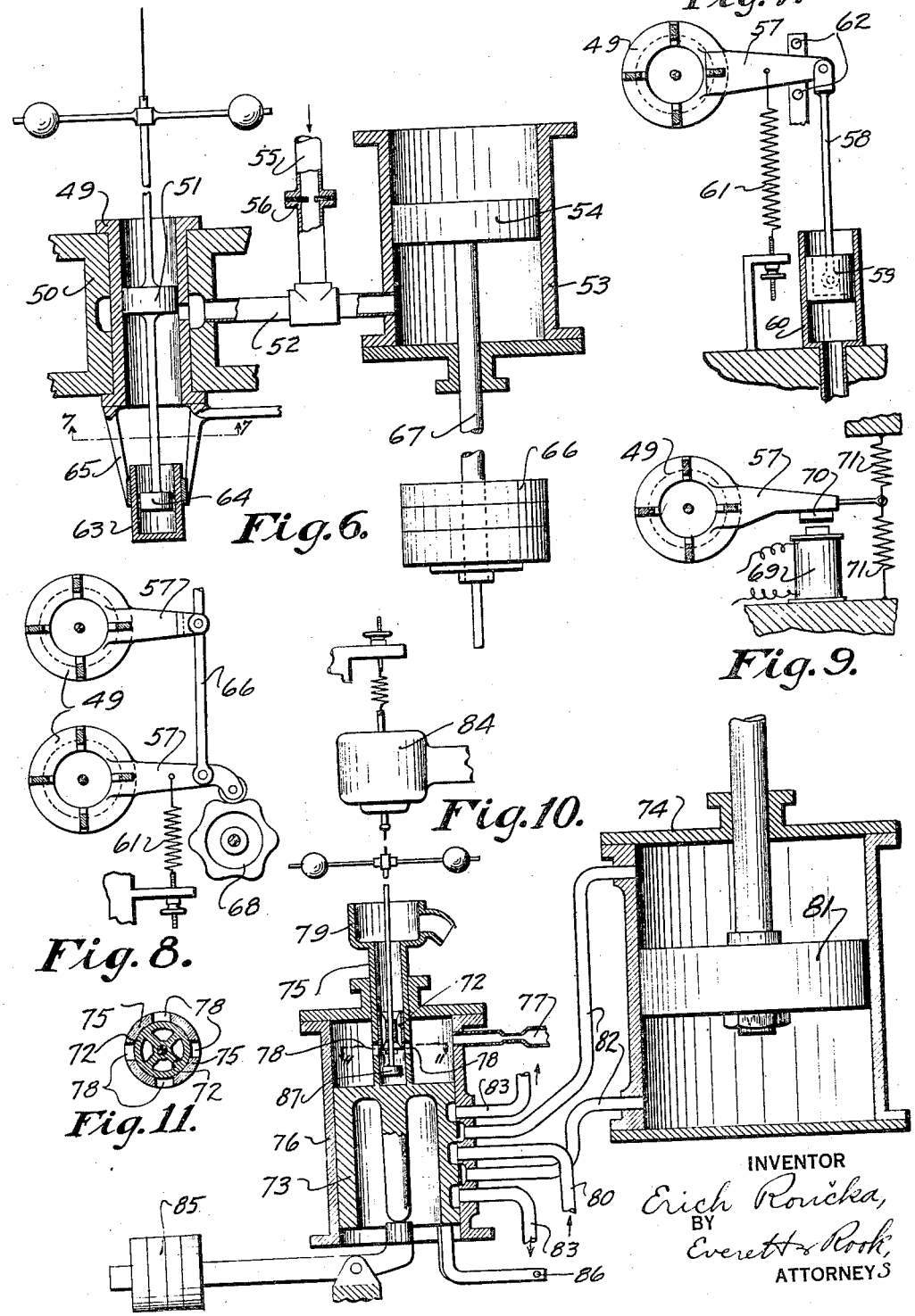
INVENTOR  
Erich Roučka,  
BY  
Everett & Rook,  
ATTORNEYS

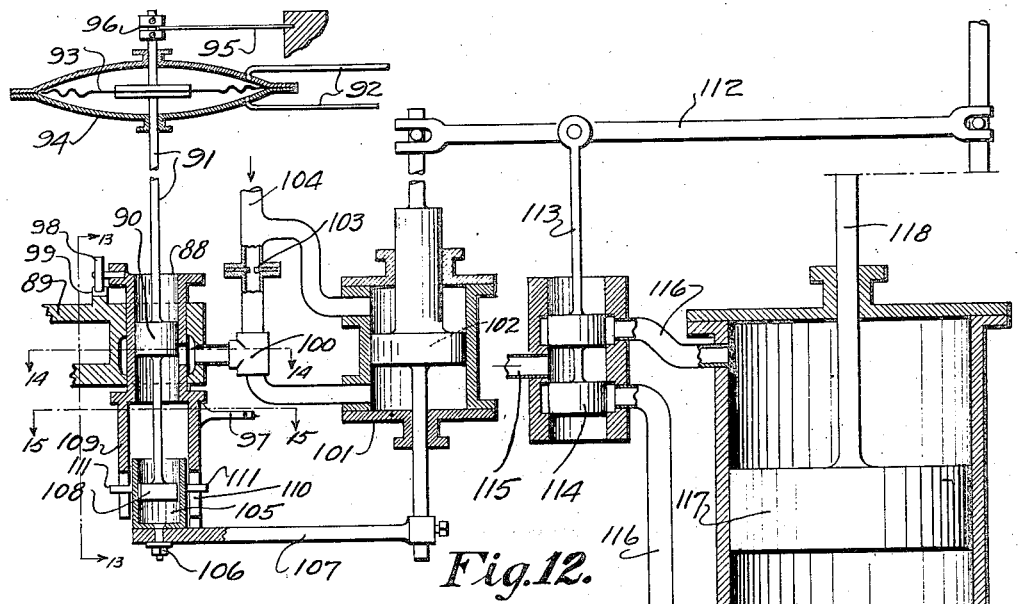

Patented Oct. 21, 1924.

1,512,804

UNITED STATES PATENT OFFICE.

ERICH ROUČKA, OF EAST ORANGE, NEW JERSEY.

AUTOMATIC REGULATOR.

Application filed March 26, 1921. Serial No. 455,973.

*To all whom it may concern:*

Be it known that I, ERICH ROUČKA, a citizen of the Republic of Czechoslovakia, and a resident of East Orange, in the county of Essex and State of New Jersey, have invented new and useful Improvements in Automatic Regulators, of which the following is a specification.

This invention relates to automatic regulators, and to measuring instruments of the balanced or compensating principle. The invention is applicable to regulators for controlling any quantities or qualities, physical or chemical, of a system by means of fluids. Such quantities and qualities may be electric current, voltage, watts consumption or production, phase angle, etc., and may relate to generators, boosters, rheostats and electric systems in general, the regulation of electric furnace electrodes, pressure of fluids, flow of fluids, speed of motion regulation of prime movers, controlling of furnaces and the like.

The objects of the invention are to provide means for greatly increasing the sensitivity and accuracy of the controlling element beyond what has heretofore been possible; to provide means for increasing the sensitivity of the controlling element which operates independently of and in a direction other than that of the controlling movements of the said controlling element; to provide improved means for preventing overthrow or hunting of the controlling element and regulator, and to obtain other results and advantages as may be brought out by the following description.

My invention, in general, consists in increasing the sensitivity and accuracy of the controlling element by producing constant relative vibrations between the slidably cooperating parts of the same independently of and in a direction other than that of the controlling movement of said elements, said vibrations being produced by mechanically or electrically vibrating one or more of the cooperating parts of the controlling element so as to reduce the friction between the slidably cooperating parts. Where the parts of the controlling element have a longitudinally or axially slidable relation the vibrations therein may be produced by rapid oscillations thereof, and where the parts of the controlling element have a rotating or oscillating relation in their controlling movements the vibrations may be produced axially or longitudinally thereof, or regardless of the direction or form of the controlling movement of the said parts the vibrations may be produced with a combined reciprocatory and oscillatory motion. The accuracy of the controlling element is also greatly enhanced by means for preventing overthrow or hunting of the controlling element, and where such means constitutes a dash pot or slidably cooperating parts, the accuracy and sensitivity of the said means is also increased by causing relative vibrations of the parts of the same.

The invention is adapted for use in regulator systems with or without a pilot motor, such as for example a piston in a cylinder, a diaphragm, float motor, rotatable motor, etc., in systems for controlling large amounts of power where a "relay" or governor motor is utilized, and where the characteristic of the system under control is to be maintained either constant in value or permitted to vary in a predetermined manner.

Referring to the accompanying drawings, in which like numerals of reference indicate the same parts throughout the several views, Figure 1 is a diagrammatic view of one application of my invention in a regulator system, the vibrations in the controlling element being produced by an electric vibrator or interrupter;

Figure 2 is a horizontal sectional view through the electric vibrator shown in Figure 1, taken on the line 2—2 of Fig. 1;

Figure 3 is a diagrammatic representation of another form of the invention in which the vibrations are produced by an electro-dynamic device;

Figure 4 is a fragmentary plan view of a mechanical means for causing the vibrations and comprising a vane against opposite sides of which jets of fluid are adapted to be alternately directed;

Figure 5 is a diagrammatic showing of another mechanical construction for causing the vibrations with a short, sharp hammer-like action;

Figure 6 is a representation of an application of my invention in which the controlling element comprises a valve element mounted in a sleeve, the sleeve being vibrated by producing rapid oscillation thereof;

Figure 7 is a horizontal sectional view taken on the line 7—7 of Fig. 6, showing the oscillations in the sleeve produced by a vibrating fluid acting on a piston connected with the sleeve;

Figure 8 shows a means for simultaneously vibrating a plurality of sleeves similar to that shown in Figure 6;

Figure 9 illustrates an electrical apparatus for producing oscillatory vibrations in the sleeve;

Figure 10 shows an application of my invention to a regulator system in which the controlling element indirectly controls a large amount of power;

Figure 11 is an enlarged horizontal sectional view taken on the line 11—11 of Figure 10;

Figure 12 shows a system similar to that illustrated in Figure 10 in which the valve sleeve is given a combined reciprocatory and oscillatory motion, the dash pot also being vibrated through rapid oscillation;

Figure 13 is an enlarged vertical sectional view taken on the line 13—13 of Figure 12;

Figure 14 is a horizontal sectional view taken on the line 14—14 of Figure 12;

Figure 15 is a similar view taken on the line 15—15 of Figure 12;

Figure 16 is a fragmentary diagrammatic view of a sleeve valve and a mechanical means for rotating the sleeve in a rapid step-by-step or interrupted motion;

Figure 17 is a horizontal sectional view taken on the line 17—17 of Figure 16;

Figure 18 is a diagrammatic view of means for producing the motion shown in Figure 16 by successive jets of a fluid against a rotating vane or wheel, and Figure 19 illustrates an application of my invention to a needle valve.

In Figure 1 of the drawings, the invention is shown as applied to a regulator system comprising a double valve element 1 slidably mounted in a cylinder or sleeve 2 and controlling the flow of fluid from an inlet pipe 3 to and from opposite sides of a piston 4 of a fluid motor 5 through pipes 6. The valve is supported by a flexible connector 7 connected to a rod 8 suspended longitudinally from an adjustable spring 9. The controlling movements of the valve may be produced by any suitable means, but in the present instance the valve is controlled by an electromagnetic or dynamic device 10 which actuates a core or secondary winding 11 secured to the rod 8, the device 10 being connected to the system under control.

The controlling movements of the valve are axially or longitudinally thereof, and the sensitivity of the valve is greatly increased by producing constant and rapid oscillatory vibrations therein. These vibrations are shown as produced in the present instance by a magnet-armature 12 rigidly connected to a rod 13 depending from the valve 1, the armature being connected to a stationary support by a spring 14. It will thus be seen that the valve 1 is balanced between the springs 9 and 14. Oscillation of the armature 12 is produced by successively changing the direction of flow of an electric current through the electro-magnets 15, and this constant change of direction of flow of the current may be produced by the alternating contact of a spring strip 16 with contacts 17 connected to opposite sides of a source of electricity such as the battery 18. The spring strip 16 is connected to one side of the circuit through the magnets 15, as at 19, and it will be observed that when the strip 16 is in contact with one of the contact points 17 the current will flow through the magnets 15 in a direction to energize them to attract the armature toward the opposite contact point 17, and this action continues to maintain the armature in a state of constant oscillation. These oscillations are transmitted directly to the valve element 1 so as to substantially reduce the friction between the valve and the sleeve 2 in its controlling movements. The flexibility of the connector 7 allows the valve to oscillate without movement of the rod 8, and preferably the rod is provided with a pair of laterally oppositely extending weighted arms 20 which serve to hold the rod 8 against vibration.

Lowering or raising of the valve element 1 by the device 10 allows a flow of fluid through one or the other of the pipes 6 to one side of the piston 4 of the fluid motor and from the other side of the piston which causes the piston to move one way or the other. The piston carries a rod 21 which may be connected to a rheostat, electric furnace electrode, a booster, etc.

Figure 3 illustrates an application of the invention to a regulator system comprising the double valve element 22 slidable in a cylinder 23 and controlling the flow of fluid through the pipes 24, 25 and 26 to and from opposite sides of a piston 27 of a fluid motor 28. The valve carries at the upper end thereof a rod 29 which may be supported in any suitable manner such as that shown in Figure 1, and the controlling movements of the valve may be produced by an electromagnetic or dynamic device similar to the device 10. A swivel connection 30 may also be utilized in place of the flexible connector 7. The valve is shown as constantly rapidly vibrated with an oscillatory motion by means of an electrodynamic device comprising an oscillating armature 31 rigidly connected by a rod 32 to the lower end of the valve, said armature being influenced by a field magnet 33. The accuracy of the valve is also increased by means for preventing the overflow or hunting thereof, and in the present instance I have shown the lower end of the armature provided with a plunger 34 mounted to reciprocate in a dash pot 35 containing a suitable damping fluid, said dash pot being carried by an arm 36 projecting from a rod 37 connected to the lower end of the piston 27 of the fluid motor. When the valve 22 descends the flow of fluid to the motor 28 causes the piston 27 to rise thereby raising the dash pot 35 which tends to impede the descent of the valve 22, and when the valve 22 is raised the piston 27 is forced downwardly lowering the dash pot 35 which tends to restrain the rising of the valve 22, thus preventing overthrowing or hunting of the valve in either direction. It will also be noted that the oscillatory vibrations produced by the armature are transmitted both to the valve 22 and the plunger 34, thereby reducing the friction both between the valve and the cylinder 23 and between the plunger 34 and dash pot 35.

One type of mechanical means for producing oscillatory vibrations in a controlling element such as the valve above described, is shown in Figure 4 of the drawing. Oppositely projecting vanes or buckets 38 may be secured to opposite sides of the valve rod, such as the rod 13 shown in Figure 1, and counterweights 39 are also connected to said rod to act in the nature of a fly-wheel. Jets of fluid are alternately directed against the respective vanes 38 through the nozzles 40 which cause the vanes 38 to be oscillated in opposite directions against spring influenced plungers 41, the plungers tending to cause the vanes to rebound.

Short, sharp, hammer-like oscillatory vibrations may be produced in the controlling element by the mechanism shown in Figure 5, which comprises oppositely extending counterweights 42 secured to a rotatable part of the controlling element, such as the valve rod 13, a spring arm 43 being also secured to the said rotating part and adapted to be alternately struck from opposite sides thereof by hammers 45 which are rapidly reciprocated in any suitable manner as by means of the crank disk 46 connected to the hammers by a pitman 47 and driven by a belt 48.

In Figure 6 the invention is applied to the vibration of the valve sleeve 49 instead of the valve, said sleeve being rotatably mounted in a support 50 and having a valve element 51 slidable therein to control the outlet of a fluid from a pipe 52 which is also connected to a fluid motor cylinder 53 at one side of the piston 54 thereof, the pipe 52 being supplied by a pipe 55 having a throttling diaphragm 56 therein. The valve 51 may be connected to any suitable controlling system, such as for example that shown in Figure 1. The valve 51 normally partially uncovers the pipe 52, and weights 66 on the piston rod 67 balance the fluid pressure in the cylinder 53. When the valve rises the fluid flows more freely out of the cylinder 53 allowing weights 66 to pull the piston downwardly, and when the valve closes the pipe 52 the fluid is forced into the cylinder 53 and raises the piston.

The sleeve 49 may be rapidly vibrated with an oscillatory motion by any suitable means, such as for example that shown in Figure 7. The valve sleeve is thus provided at one end thereof with a laterally projecting arm 57 which is connected by a rod 58 to a piston 59 slidable in a cylinder 60. Pulsating or vibrating fluid is admitted behind the piston 59 to vibrate the same, said vibrations being transmitted to the sleeve to constantly and rapidly oscillate the same, a spring 61 being provided to move the sleeve against action of the fluid behind the piston 59. Stops 62 are provided to limit the motion of the arm 57. A dash pot 63 containing a suitable damping fluid to prevent overthrow of the valve 51 may also be oscillated or vibrated simultaneously with the sleeve 49 to reduce friction between the dash pot and a plunger 64 connected to the valve. For this purpose the dash pot may be rigidly supported in depending arms 65 on the sleeve. Thus friction is substantially reduced both between the sleeve 49 and the valve 51 and between the plunger 64 and dash pot 63.

Figure 8 illustrates a mechanical apparatus for simultaneously vibrating a plurality of sleeves such as sleeve 49, a link 66 being connected to all of the arms 57 of the various sleeves and one of the arms carrying a roller engaging a rapidly rotating cam wheel 68 which serves to reciprocate the link 66 which in turn oscillates all the arms 57.

In Figure 9 electrical means for vibrating the sleeve in a manner similar to that above described in connection with Figure 6 is shown, said means comprising an electromagnetic or dynamic device 69 adapted to alternately attract and release an armature 70 on the arm 57, said arm being balanced or held in neutral position by oppositely arranged tension springs 71 connected to opposite sides thereof.

The invention is also applicable to a regulator system such as that shown in Figure 10 in which the hollow valve 72 controls a large amount of power indirectly through the governor 73 and fluid motor 74. The valve is slidable in a sleeve or tube 75 carried by the governor 73 which is slidable in a cylinder 76, said valve controlling the flow of a fluid for actuating the governor from the inlet pipe 77 through ports 78 in the sleeve to an overflow 79, the governor 73 controlling the flow of fluid from the inlet pipe 80 to and from opposite sides of the piston 81 of the fluid motor through pipes 82 and outlet pipes 83. The valve element 72 is controlled by suitable means such as an electromagnetic or dynamic device 84 and is supported substantially as shown in Figure 1. When the valve 72 partially uncovers the ports 78 the fluid is free to flow out of the cylinder through the overflow 79 and the governor is held balanced by the counterweight lever 85. As the valve more fully uncovers the ports 78 the fluid allows the governor to rise under influence of the counterweight 85 to allow fluid to flow from the inlet 80 to the under side of the piston 81 of the fluid motor and an outlet of fluid from the other side of the piston through the outlet pipe 83, and when the valve covers ports 78 a reverse action takes place.

The governor 73 is adapted to be constantly vibrated with an oscillatory vibration by any suitable means such as for example those above described, through an arm 86 thereon, and it will be noted that such vibrations will be transmitted directly to the sleeve 75 so that friction is substantially reduced both between the governor and the cylinder 76 and between the valve element 72 and sleeve 75. A plunger 87 is connected to the lower end of the valve and slides in the sleeve 75 which acts as a dash pot and the vibration of the sleeve 75 also reduces friction between it and said plunger.

In Figure 12 of the drawings I have shown an application of my invention which consists in producing a combined reciprocatory and oscillatory motion in one of the slidably cooperating parts of the controlling element. In the present instance I have shown means for producing the said motion in a sleeve 88 rotatably mounted in a support 89, said sleeve having slidably mounted therein a valve 90 carried by a rod 91 and adapted to be actuated from the system under control by means of fluid pressure from pipes 92 acting upon a diaphragm 93 connected to the rod 91 and mounted in a chamber 94, the valve being held in normal position by means of the spring strip 95 engaging a grooved collar 96 on the rod 91.

The oscillatory vibration of the sleeve 88 may be produced by any suitable means, such as for example those above described, through an arm 97 mounted on the sleeve, and the reciprocating motion of the sleeve may be simply produced through a roller 98 mounted on the end of the sleeve to travel on an inclined track 99 on the support 89. With this construction it will be noted that as the sleeve is oscillated through the arm 97 the roller 98 is caused to move up and down on the inclined track 99 which causes the sleeve 88 to reciprocate, this reciprocation of the sleeve being simultaneous with the oscillation or partial rotation thereof. The friction between the valve 90 and the sleeve 88 on the controlling movements of the valve is thus substantially reduced.

The valve 90 controls the outlet of fluid from a pipe 100 which has one end thereof connected to the cylinder 101 of a fluid motor at one side of the piston 102 thereof, having a throttling diaphragm 103 interposed between it and the supply pipe 104 which is connected to the fluid motor at the other side of the piston 102. A dash pot 105 containing a suitable damping fluid is provided for preventing overthrow of the valve 90, said dash pot having a swivel connection 106 with an arm 107 depending from the piston 102. The valve 90 is provided with a plunger 108 submerged in the fluid in the dash pot 105. When the valve 90 is moved downwardly to limit the outlet of the fluid from the pipe 100, the greater pressure of fluid is forced beneath the piston 102 which causes the same to rise. This raises the dash pot 105 which tends to restrain the descent of the valve 90, and when the valve is raised to allow free outlet of fluid from the pipe 100 the greater pressure of fluid in the pipe 104 forces the piston 102 downwardly lowering the dash pot 105 which tends to restrain the raising of the valve 90. The accuracy of the action of the dash pot is greatly increased by relative vibration between it and the plunger 108, and for the purpose of producing this vibration I may provide the sleeve 88 with a plurality of depending arms 109 having slots 110 to receive pins 111 projecting laterally from the dash pot 105. With this construction it will be seen that the oscillation of the sleeve 88 will be transmitted through the arms 109 to the dash pot, oscillating it about its swivel connection 106, the slots 110 allowing for the up and down movement of the dash pot incident to the movement of the piston 112.

The piston of the fluid motor 101 is connected to one end of a governor lever 112 having pivotally connected thereto intermediate its ends a rod 113 connected to a governor 114 which controls the flow of fluid from inlet pipe 115 through pipes 116 to and from opposite sides of the piston 117 of a fluid motor, the piston rod 118 of which is connected to the opposite end of the lever 112 and to a rheostat, an electric furnace-electrode, etc. It will be understood that reciprocation of the relay motor piston 102 causes reciprocation of the governor 114 to control the flow of fluid to the opposite sides of the piston 117, the piston 117 moving in a direction opposite to that of the next preceding controlling movement of the governor 113 so as to always return the governor to normal position.

In Figures 16 and 17 I have shown means for mechanically rotating a sleeve, such as the sleeve 88, with a rapid step-by-step or interrupted motion, the said means comprising a ratchet 119 on the sleeve which is engaged by a spring pawl 120 mounted on one end of a plunger 121, the other end of which carries a roller 122 held in engagement with a rotating cam 123 by a spring 124. It will be noted that with this construction the continuous reciprocation of the plunger 121 by the cam 123 will cause a forward and backward motion of the pawl 120 to successively engage the teeth of the ratchet 110 so as to rotate the sleeve with a step-by-step motion, this vibration of the sleeve serving to reduce the friction between itself and the valve mounted therein.

Figure 18 shows another means for producing a similar motion of a sleeve or a valve which comprises a turbine wheel 125 adapted to be mounted on the sleeve or the valve and having spaced buckets or vanes 126 on the periphery thereof which are adapted to be successively engaged by interrupted jets of fluid from a nozzle 127, which produces a step-by-step or interrupted motion of the wheel similarly to that described in connection with Figures 16 and 17.

In Figure 19 I have shown an application of the invention to a controlling element including a needle valve 128 slidably mounted in a casing 129 and controlling the flow of fluid through pipes 130 and 131. In this form of the invention the valve 128 is slidable through a sleeve 132 rotatably mounted in the casing 129, said sleeve being adapted to be readily oscillated or vibrated by any suitable means, such as for instance, those above described, through an arm 133, the vibration of said sleeve materially reducing the friction between the valve element 128 and the sleeve 132.

Having thus described the invention, what I claim is:

1. A system of the character described comprising a controlling element including a plurality of relatively movable cooperating parts, means for controlling movement of said parts in response to variations in the system under control, means for preventing overthrowing or hunting of said parts comprising a plurality of slidably cooperating parts, and means for producing relative vibrations between said slidably cooperating parts of the overthrow preventing means to reduce friction therebetween.

2. A system of the character described comprising a controlling element consisting of a plurality of relatively movable slidably cooperating parts, means for controlling movement of said parts in response to variations in the system under control, means for preventing overthrowing or hunting of said parts comprising a plurality of slidably cooperating parts, and means for simultaneously producing relative vibrations between said slidably cooperating parts of both said controlling element and said overthrow preventing means.

3. A system of the character described comprising a plurality of relatively movable slidably cooperating parts, means for controlling movement of said parts in response to variations in the system under control, means for constantly producing relative vibrations between said slidably cooperating parts in a direction other than the direction of the controlling movements of said parts to reduce friction between said slidably cooperating parts, and means for preventing overthrow or hunting of said slidably cooperating parts and the regulator.

4. A system of the character described comprising a plurality of relatively longitudinally and rotatably movable slidably cooperating parts, means for controlling relative longitudinal movement of said parts in accordance with variations in the system under control, and means for constantly producing relative rotation of said parts alternately in opposite directions to reduce friction therebetween.

5. A system of the character described comprising a casing, a sleeve therein, a piston slidable in said sleeve, said piston and sleeve being relatively longitudinally and rotatably movable, means for controlling relative longitudinal movement of said sleeve and said piston in accordance with variations in the system under control, and means for constantly producing relative rotation of said sleeve and said piston alternately in opposite directions to reduce friction therebetween.

6. A system of the character described comprising a casing, a sleeve therein, a piston slidable in said sleeve, said piston and sleeve being relatively longitudinally and rotatably movable, means for controlling relative longitudinal movement of said sleeve and said piston in accordance with variations in the system under control, and means for constantly rotating said sleeve alternately in opposite directions to reduce friction between said sleeve and said piston.

7. A system of the character described comprising a plurality of relatively longitudinally and rotatably movable slidably cooperating parts, means for controlling relative longitudinal movement of said parts in accordance with variations in the system under control, and means for simultaneously producing both relative rotation and relative longitudinal movement of said parts alternately in opposite directions independently of said controlling movement to reduce friction therebetween.

8. A system of the character described comprising a plurality of relatively longitudinally and rotatably movable slidably cooperating parts, means for controlling relative movement of said parts in accordance with variations in the system under control, and means for simultaneously producing both relative rotation and relative longitudinal movement of said parts alternately in opposite directions independently of said controlling movement to reduce friction therebetween.

9. A system of the character described comprising a casing, a sleeve therein, a piston slidable in said sleeve, said piston and sleeve being relatively longitudinally and rotatably movable, means for controlling relative movement of said sleeve and said piston in accordance with variations in the systems under control, and means for simultaneously producing both longitudinal and rotative movement of said sleeve alternately in opposite directions to reduce friction between said sleeve and said piston.

10. A system of the character described comprising a controlling element including a plurality of relatively movable cooperating parts, means for controlling movement of said parts in response to variations in the system under control, means for preventing overthrowing or hunting of said parts comprising a plurality of slidably cooperating relatively longitudinally movable and rotatable parts, and means for producing relative rotation of said slidably cooperating parts alternately in opposite directions to reduce friction therebetween.

11. A system of the character described comprising a fluid motor, a controlling device for controlling the flow of fluid to said motor in accordance with variations in the system under control, means for preventing overthrowing or hunting of said controlling device including a plurality of relatively longitudinally movable and rotatable slidably cooperating parts one of which is connected to said controlling device and the other adapted to be actuated in accordance with said motor, and means for producing relative rotation of said slidably cooperating parts alternately in opposite directions to reduce friction therebetween.

12. A system of the character described comprising a controlling element consisting of a plurality of relatively longitudinally movable and rotatable slidably cooperating parts, means for controlling movement of said parts in response to variations in the system under control, means for preventing overthrowing or hunting of said parts comprising a plurality of relatively longitudinally movable and rotatable slidably cooperating parts, and means for simultaneously producing relative rotation alternately in opposite directions of said slidably cooperating parts of both said controlling element and said overthrow preventing means to reduce friction between said parts.

ERICH ROUČKA.